United States Patent [19]

Ammon et al.

[11] Patent Number: 5,143,573
[45] Date of Patent: * Sep. 1, 1992

[54] PROCESS AND DEVICE FOR APPLYING A FLEXIBLE LAYER TO ROLLERS FOR GRAPHIC MACHINES

[75] Inventors: Ernst Ammon, Seidenweg; Robert Langsch, Zollikofen, both of Switzerland

[73] Assignee: Wifag, Bern, Switzerland

[*] Notice: The portion of the term of this patent subsequent to May 19, 2009 has been disclaimed.

[21] Appl. No.: 544,207

[22] Filed: Jun. 26, 1990

[30] Foreign Application Priority Data

Jun. 27, 1989 [DE] Fed. Rep. of Germany ....... 3921037

[51] Int. Cl.$^5$ ............................................. B23P 11/02
[52] U.S. Cl. ...................................... 156/294; 29/450; 29/235; 156/287
[58] Field of Search ...................... 156/294, 287, 423; 29/450, 234, 235, 451, 446, 426.6

[56] References Cited

U.S. PATENT DOCUMENTS

| | | | |
|---|---|---|---|
| 2,645,004 | 7/1953 | Dorner | 29/450 |
| 2,721,601 | 10/1955 | Spencer | 156/294 |
| 3,146,709 | 9/1964 | Bass et al. | 29/450 |
| 3,647,589 | 3/1972 | Felden | 156/294 |
| 3,846,901 | 11/1974 | Lovett | 29/450 |
| 3,900,941 | 8/1975 | Browning et al. | 29/450 |

FOREIGN PATENT DOCUMENTS

| | | |
|---|---|---|
| 1189688 | 4/1959 | Fed. Rep. of Germany . |
| 2515682 | 4/1975 | Fed. Rep. of Germany . |
| 3505214A1 | 2/1985 | Fed. Rep. of Germany . |

*Primary Examiner*—John J. Gallagher
*Assistant Examiner*—Daniel J. Stemmer
*Attorney, Agent, or Firm*—McGlew & Tuttle

[57] ABSTRACT

A device and method for applying a flexible layer to rollers, as used in graphics machines, such as printing presses or coating machines, whose roller bodies consist of a carrying tube (3). A tubular, flexible body (14) is provided which is pushed over a support tube (1) that is axially connected to a transition piece (2) and a carrying tube (3). In the area of the transition piece (2), compressed air is admitted and is discharged at a discharge force, to generate an air cushion (15) between the tubular, flexible body (14) and the carrying tube (3), over which the tubular, flexible body (14) is pushed.

9 Claims, 5 Drawing Sheets

PROCESS AND DEVICE FOR APPLYING A FLEXIBLE LAYER TO ROLLERS FOR GRAPHIC MACHINES

FIELD OF THE INVENTION

The invention relates generally to transfer and inking rollers and to a process and apparatus for applying a flexible layer to rollers used in graphic machines such as printing presses or coating machines and more particularly to applying a flexible layer to rollers which include a dimensionally stable carrying tube that is closed at both ends with covers for receiving bearing journals.

BACKGROUND OF THE INVENTION

Such rollers are used, e.g., in printing presses as transfer and inking rollers in inking and dampening systems. Since these rollers are used as connecting rollers between rollers with hard surfaces, they must have a flexible surface. Their surface also must be such that they are able to transfer the corresponding media without problems.

The rollers are normally produced by vulcanizing a flexible layer on a tubular steel body. In most cases, the material vulcanized on the roller consists of a rubber batch. The vulcanized rubber layer is subsequently ground to the desired dimension.

After a rather long aging time of the rubber layer, such rollers reach practically constant dimensional stability. Immediate use causes problems as a consequence of different dimensions, especially in the case of rollers to be replaced, which often have to be manufactured as new rollers.

Such rollers require constant readjustments. The vulcanization of the rubber layer is very complicated and expensive, especially for replacement rollers, because these rollers are usually manufactured as individual parts or in small lots. It is also necessary to make the carrying tube of a metallic material because of the temperatures that occur. Carrying tubes made of carbon fiber-reinforced plastic to increase stability and reduce weight are unsuitable.

SUMMARY AND OBJECTS OF THE INVENTION

It is an object of the present invention is to provide a process with which rollers are provided with a flexible layer and are immediately ready to use in a simple, time-saving, and inexpensive manner.

According to the invention, a flexible material element is provided comprising a tubular body formed having a length corresponding to the width of the roller. The tubular flexible body is first pushed over a support tube having a support tube diameter. The support tube carrying the flexible body is axially connected to a carrying tube via a transmission piece. Compressed air is supplied to a discharge zone of the transition piece and the tubular flexible body is pushed from the support tube, via the transition piece, completely over the carrying tube on a cushion of air which is built up by the compressed air issuing at the discharge zone.

The apparatus includes the arrangement of the support tube and transition piece which are connected to the carrying tube. The transition piece has a conical surface with a smaller diameter corresponding to the diameter of the support tube and a larger diameter which is slightly larger than the diameter of the carrying tube. The transition piece includes axial threaded pins on both sides which pins are received in threaded holes formed in the support tube and carrying tube. On an end face of the conical surface of the transition piece, at the larger diameter end, an annular channel is provided which communicates via holes with a bore arranged axially in the threaded pin. A compressed air connection piece may be screwed into an end cover of the carrying tube such that air enters the transition piece via the carrying tube and then via the bore arranged axially in the threaded pin.

This process makes it possible to pull a tubular, flexible body over the carrying tube in such a way that it is prestressed, as a result of which adhesion can be dispensed with in certain cases.

According to a further aspect of the process of the invention, the carrying tube is coated with an adhesive prior to the tubular flexible body being pushed over it.

Handling becomes very simple if the support tube is closed on one side with a cover which is centrally provided with an axial threaded hole. The transition piece can be screwed into this threaded hole. The carrying tube is also closed on both sides with covers which in turn have centrally arranged, axial threaded holes. Thus, the carrying tube can also be screwed onto the transition piece.

A compressed air connection can be screwed into the cover opposite the transition piece. Compressed air is then admitted into the transition piece through the carrying tube. The compressed air is discharged through openings arranged in the transition piece, preferably in the zone of the junction site with the carrying tube. The released compressed air forms an air cushion under the tubular, flexible body allowing it to be pushed over.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the drawings:

FIG. 2 is a partial sectional view of the device of FIG. 1 in which a tubular, flexible body is being pulled on;

DETAILED DESCRIPTION OF THE PREFERRED EMBODIMENT

Figure 1:
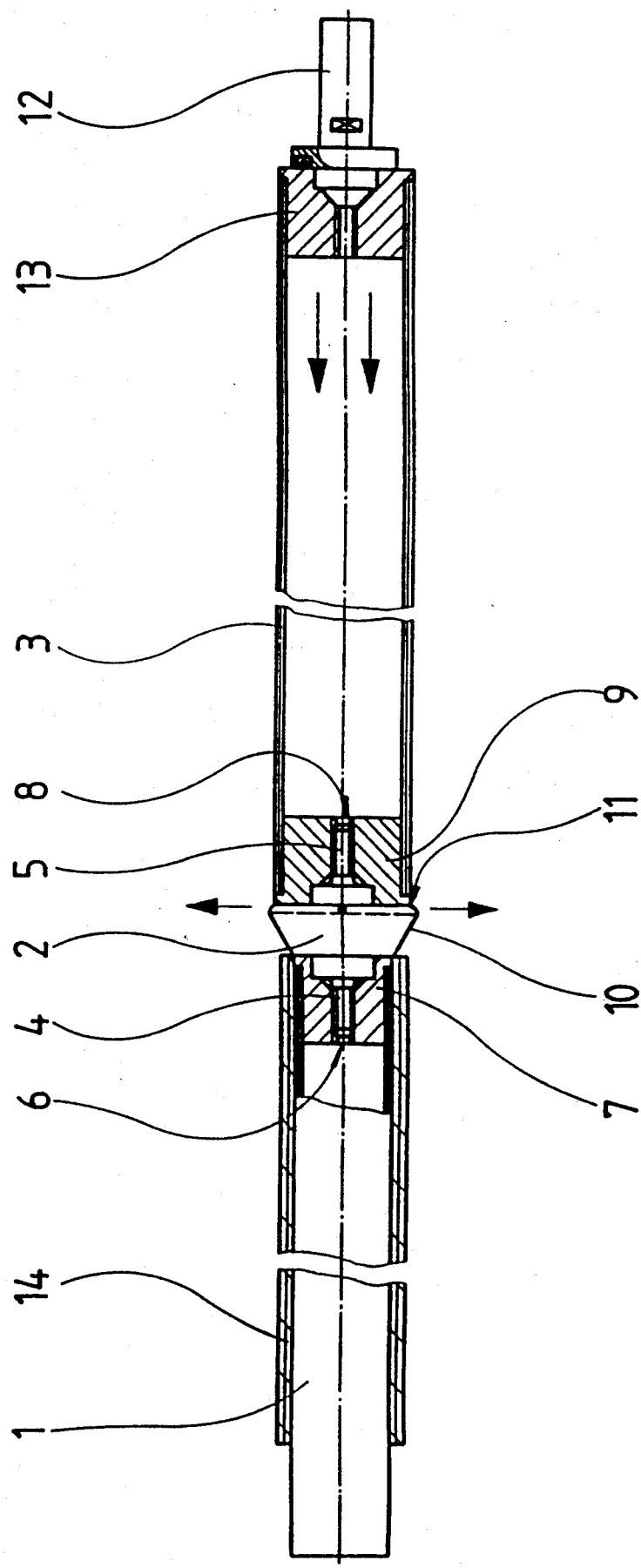
FIG. 1 is a sectional view of a device for pulling the tubular, flexible body which is still located on the support tube.

As is apparent from FIG. 1, a support tube 1, a transition piece 2, and a carrying tube 3 are screwed together axially. The transition piece 2 is equipped on both sides with a threaded pin 4, 5 each.

The threaded pin 4 fits into a threaded hole 6 provided in a cover 7 which closes the support tube, while the threaded pin 5 is screwed into a threaded hole 8 which is provided in cover 9 that closes the carrying tube 3.

The transition piece 2 has a conical surface 10 which bridges over the increase in diameter from the support tube 1 to the carrying tube 3. Compressed air, which is fed in via a compressed air connection piece 12, which is screwed into cover 13 that closes the carrying tube 3 on the other side, and the carrying tube 3 on the other side, is discharged in the area of the junction site 11 between the transition piece 2 and the carrying tube 3. The tubular, flexible body 14 is pushed over the support tube 1. The external diameter of the support tube 1 is smaller than the smallest acceptable internal diameter of the tubular, flexible body 14.

Figure 2:
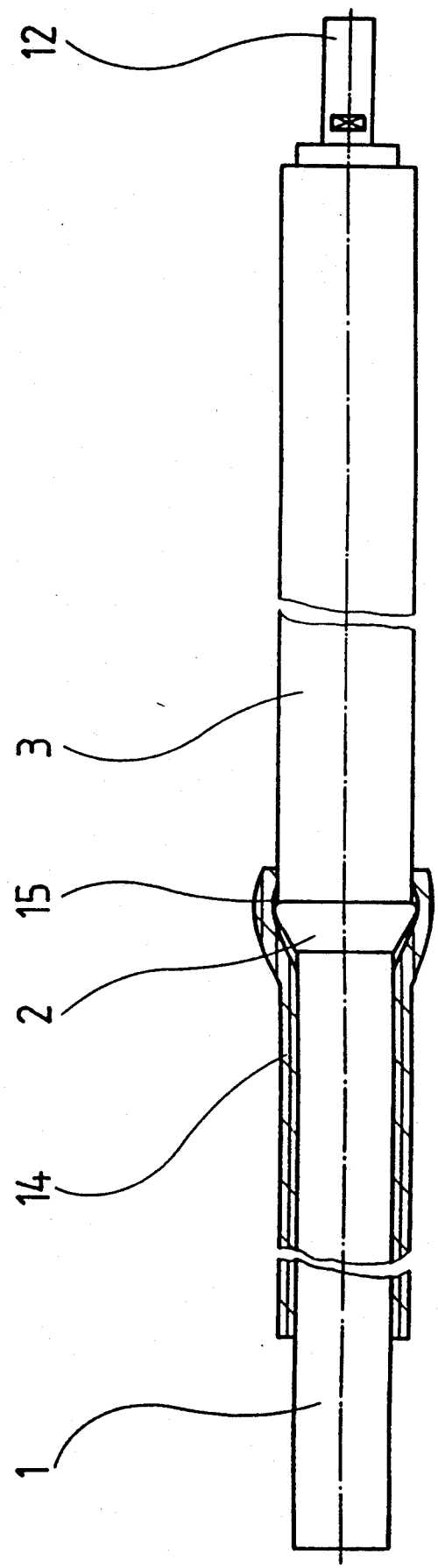
Figure 3:
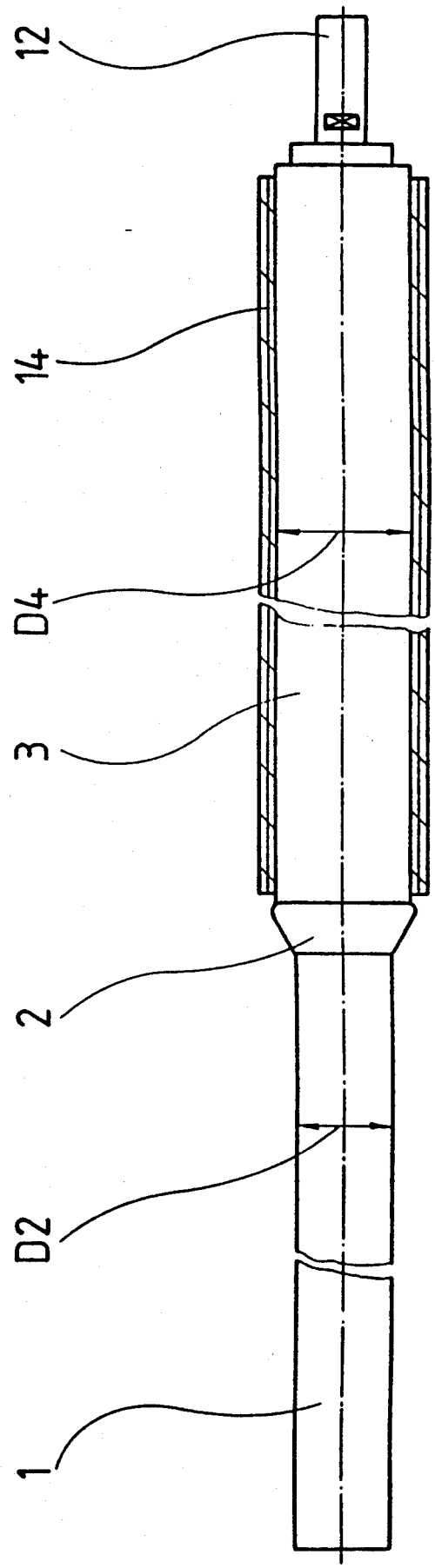
FIG. 3 is a partial sectional view of the device with the tubular, flexible body pulled on completely.

The tubular, flexible body 14 is now pushed over the conical surface 10 of the transition piece 2 in the direction of the carrying tube 3, as is shown in FIG. 2. As soon as the beginning of the tubular, flexible body 14 has been pushed over the junction site 11, an air cushion 15 is formed by the compressed air being discharged between the tubular, flexible body 14 and the carrying tube 3. The air cushion 15 makes it possible to pull the tubular, flexible body 14 over the carrying tube 3 completely and without problems, as is shown in FIG. 3. The external diameter of the carrying tube 3 is larger than the largest acceptable internal diameter of the tubular, flexible body 14, so that the tubular, flexible body 14 pulled over the carrying tube 3 is always pretensioned to a certain extent.

The carrying tube 3 is normally coated with an adhesive before the tubular, flexible body 14 is pulled over. Pulling over the tubular, flexible body 14 does not cause a problem even with the adhesive, because of the air cushion 15 which builds up, and since the tubular flexible body 14 shrinks due to its pre-tension after the compressed air source is switched off. No additional pressing is needed to cure the adhesive, and adhesion will be optimal.

Figure 5:
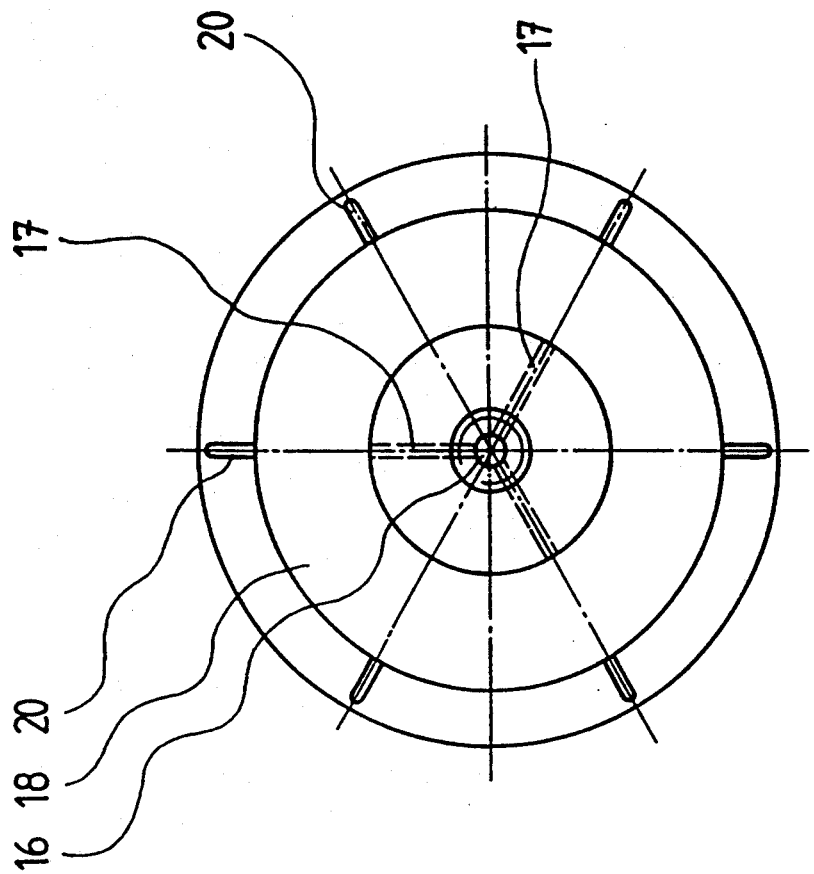
FIG. 5 is a top view of the transition piece.
Figure 4:
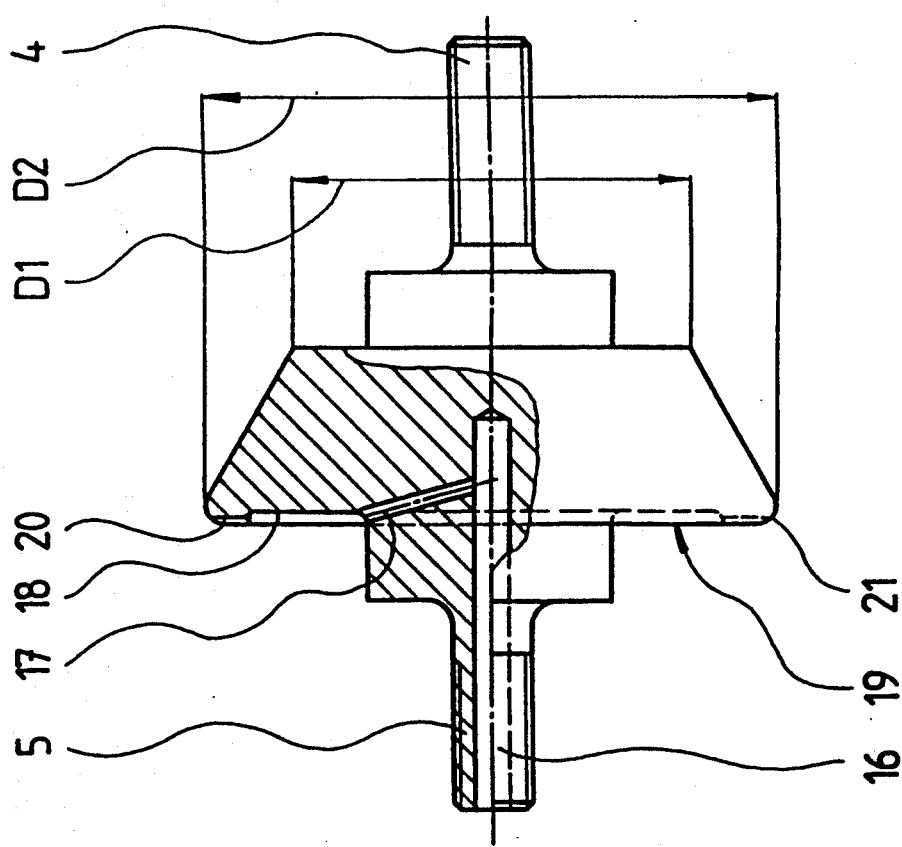
FIG. 4 is a partial cutaway view of a transition piece.

FIG. 4 and FIG. 5 show the transition piece 2. The threaded pins 4 and 5 are arranged on both sides of the conical surface 10. The threaded pin 5, which is screwed into the cover 9 of the carrying tube 3, has an axial bore 16 in its center. Substantially radially provided holes 17 connect the bore 16 to an annular channel or canal 18. The holes 17 open into the bore 16. The annular canal 18 is recessed in the end face 19 of the conical surface 10 with the large diameter around its center. Radially arranged grooves 20 serve as passage openings for the compressed air that is introduced through the carrying tube 3, and the compressed air is discharged in the zone of the junction site 11 between the transition piece 2 and the carrying tube 3.

In its thickest area, which becomes connected to the carrying tube 3, the conical surface 10 has a larger diameter than the carrying tube 3 itself. This area, which is provided with a rounded zone 21 and projects over the carrying tube 3, serves essentially as a seal for the compressed air to prevent it from escaping in the direction of the support tube 1 under the tubular flexible body 14 which is to be pulled over.

Figure 6:
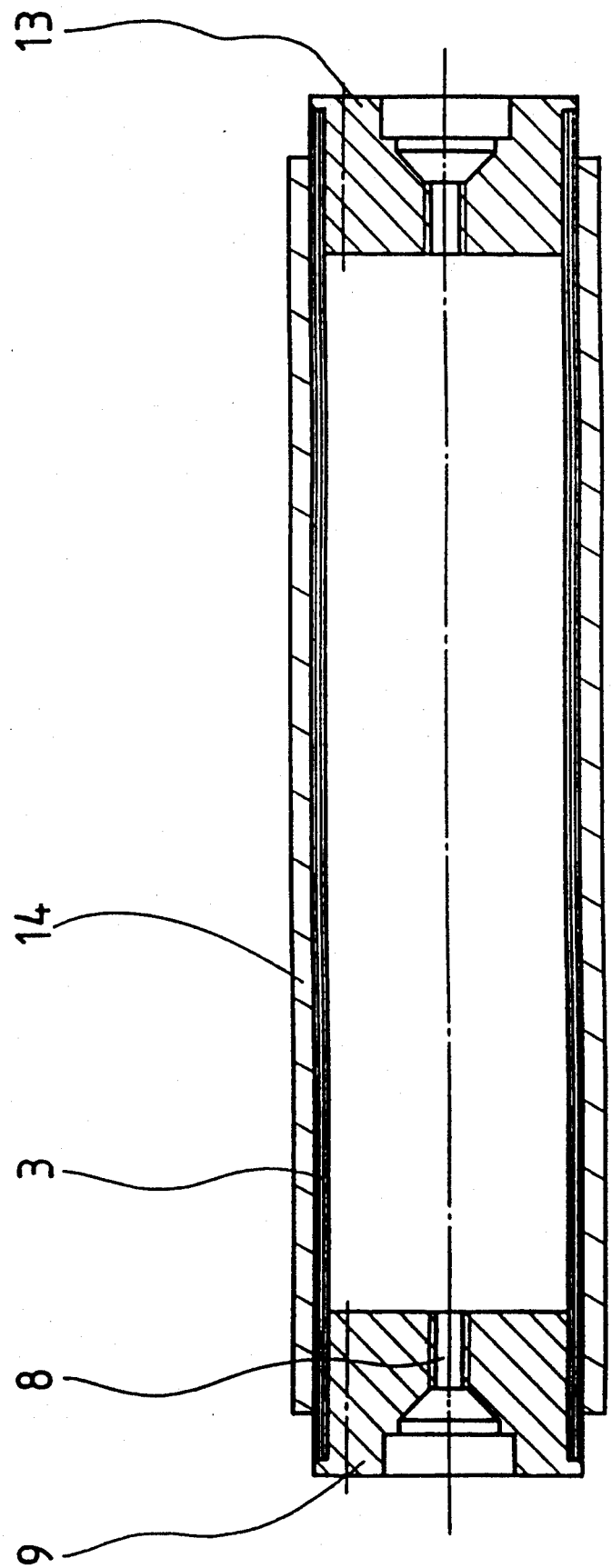
FIG. 6 is a sectional view of the finished roller.

FIG. 6 shows the finished roller. The tubes used as the carrying tube 3 are commercially available precision tubes, which do not require any further operations besides cutting to the desired length. The covers 9 and 13 are pressed in. The tubular, flexible body 14 is ground to the desired diameter.

The carrying tube 3 may consist of practically any desired material which has the required strength. One is not forced to use steel tubes due to the elimination of vulcanization of a rubber layer.

While a specific embodiment of the invention has been shown and described in detail to illustrate the application of the principles of the invention, it will be understood that the invention may be embodied otherwise without departing from such principles.

What is claimed is:

1. A process for applying a flexible layer to transfer linking rollers for use in graphics machines, comprising the steps of:
providing a roller including a dimensionally stable carrying tube, said carrying tube having a first mounting end and a second mounting end for providing a compressed gas conduit; providing a compressed gas connection at said first mounting end and passing gas through said first mounting end and through said compressed gas conduit to said second mounting end; providing a tubular body of flexible material having a length, the support tube having an external diameter smaller than an internal diameter of the tubular body; providing a transition piece including a first connection end and a second connection end, said first connection end providing a transition piece conduit extending from said first connection end to a discharge zone; said transition piece also having a conical surface and a discharge side, said conical surface including a small diameter end, the small diameter end providing a diameter substantially equal to said external diameter of said support tube and including a large diameter end, said large diameter end providing a diameter large than an external diameter of said carrying tube, said discharge side providing a substantially angled surface extending from said large diameter end to a reduced diameter end, the reduced diameter end having a diameter substantially equal to a diameter of said carrying tube, a region between said reduced diameter end and said large diameter end defining said discharge zone; pushing said tubular body over said support tube; connecting said support tube to said second end of said transition piece; connecting said first end of said transition piece to said second end of said carrying tube; supplying compressed air through said compressed gas conduit and said transition piece conduit to direct compressed air from said discharge zone outwardly of said transition piece and simultaneously rearwardly, in a direction of said carrying tube; and, pushing said flexible body from said support tube to said carrying tube over said transition piece and establishing an air cushion between said carrying tube, said transition piece and said tubular body.

2. A process according to claim 1, wherein said carrying tube is coated with an adhesive prior to said tubular body being pushed over said carrying tube.

3. A device for applying a soft elastic layer to rollers which are used in printing machines, the device comprising:
a roller formed of a dimensionally stable carrier tube, the carrier tube having a first and second end enclosed with covers to receive bearing journals;
a support tube having an external diameter;
a transition piece including a conical surface having a first conical surface end with a small diameter, said small diameter substantially corresponding to said support tube external diameter and having a second conical surface end with a large diameter, said large diameter being larger than the diameter of said carrier tube and having a discharge surface extending between said second conical surface end and a transition piece reduced diameter end, said transition piece reduced diameter end having a diameter substantially equal to the diameter of said carrier tube;

a tubular body having a soft elastic layer, the tubular body having an internal diameter which is larger than the support tube external diameter; said transition piece defining a transition piece conduit from a transition piece connection end, connected to an end of said roller, to openings at said discharge surface, between said second conical end and said rear end of said transition piece; said transition piece including connection means at said transition piece connection end for connecting said transition piece to said roller and for receiving compressed air from said roller for supplying compressed air to said discharge surface; said transition piece including a second connection element for connecting said support tube to said transition piece wherein said support tube having the tubular body thereon, said transition piece and said roller are connected extending essentially axially and the tubular body is passed over said transition piece to said roller on an air cushion.

4. A device according to claim 3, wherein said transition piece first and second connection elements include threaded pins, said support tube and said carrier tube are closed at least one end with a cover, each cover including a threaded hole for receiving said threaded pin, said carrier tube including an opening forming a part of said connection means, and one of said threaded pins including a conduit forming a part of a transition piece air supply duct.

5. A device according to claim 4, wherein said transition piece conduit includes an annular canal communicating with threaded hole and grooved shaped canals extending from said annular canal radially outwardly to said discharge surface.

6. A device according to claim 4 further comprising a compressed air connection pipe including connection means for screwing said compressed air connection pipe into an end of said carrier tube for directing compressed air through said carrier tube to a transition piece compressed air duct.

7. A device according to claim 4, wherein said carrier tube is coated with an adhesive before the tubular body is pushed over said carrier tube.

8. A device for applying a layer to a roller, comprising:

a carrier tube forming a roller support surface; a first carrier tube end including a connection bore; a second carrier tube end including a connection bore, said first carrier tube end connection bore and said second carrier tube connection bore being connectable to bearing journals for mounting the carrier tube as a roller in a printing press or coating machine; a transition piece including a conical surface with a first end of small diameter and a second end of large diameter, said large diameter being greater than a diameter of said carrier tube, said transition piece including a portion defining a junction site between said second end of said conical surface and a reduced diameter end of said transition piece, said reduced diameter end of said transition piece having a diameter substantially equal to said carrier tube, said transition piece including a first connection pin extending from said transition piece adjacent said conical surface first end and including a second connection pin extending from said transition piece from said reduced diameter end; compressed gas supply means defined by said transition piece including a duct extending through said second connection pin to a discharge zone at said junction site; discharge means defining a compressed air connection for supplying compressed air from said carrier tube first end to said second end for delivering gas to said gas supply means after connection of said transition piece second connection pin to said second end of said carrier tube; a support tube having an external diameter substantially equal to said small diameter and a connection end including a bore for receiving said transition piece first connection pin; and a tubular body forming a soft elastic layer, said tubular body having an internal diameter larger than said external diameter of said support tube, said tubular body being pulled from said support tube over said transition piece onto said roller on a cushion of air which is built up by the compressed air issuing at the discharge zone after said carrier tube, transition piece and support tube are connected axially.

9. A device according to claim 8, wherein said discharge means discharges compressed air radially outwardly and in a direction of said carrier tube when said carrier tube and said transmission piece establish said air connection.

* * * * *